United States Patent Office 3,016,335
Patented Jan. 9, 1962

3,016,335
RING-A DEHYDROGENATION OF STEROIDS
WITH NOCARDIA MICROORGANISMS
Thomas H. Stoudt, Westfield, N.J., assignor to Merck & Co., Inc., Rahway, N.J., a corporation of New Jersey
No Drawing. Filed Oct. 14, 1955, Ser. No. 540,626
1 Claim. (Cl. 195—51)

This invention is concerned generally with the production of valuable steroid compounds by fermentation. More particularly, it relates to a novel microbiological method for introducing a double bond between the C-1 and C-2 carbon atoms of the steroid nucleus by means of microorganisms of the genus Nocardia. In accordance with a preferred embodiment of the invention, $\Delta^4$-3-keto-steroids such as $\Delta^4$-pregnene-3,11,20-trione-17$\alpha$,21-diol and $\Delta^4$-pregnene-3,20-dione-11$\beta$,17$\alpha$,21-triol are converted to the corresponding $\Delta^{1,4}$-3-keto-steroids, $\Delta^{1,4}$-pregnadiene-3,11,20-trione-17$\alpha$,21-diol and $\Delta^{1,4}$-pregnadiene-3,20-dione-11$\beta$,17$\alpha$,21-triol, respectively. The latter compounds possess cortisone activity but differ from cortisone in being substantially free from undesired side effects such as edema since they do not possess any appreciable sodium or water retention action.

The preparation of $\Delta^{1,4}$-3-keto-steroids by chemical means has been unsatisfactory due to the fact that the chemical reactions involved give mixtures of several compounds. Separation of the desired intermediates and final products from such mixtures is costly and results in the obtainment of low yields of the desired $\Delta^{1,4}$-3-keto-steroid compounds.

It was an object of the present invention to discover a one-step method for introducing a $\Delta^1$ double bond into steroid compounds, and to achieve this $\Delta^1$ unsaturation by a selective method which would result in the formation of the desired $\Delta^1$-steroid uncontaminated by unwanted by-products.

It was a further object to discover a method whereby $\Delta^4$-3-keto-pregnene compounds could be converted directly, and in high yield to the corresponding $\Delta^{1,4}$-3-keto-pregnadiene compounds.

It was a still further object to achieve the production of $\Delta^{1,4}$-3-keto-steroids of the pregnane series directly, and in high yield, from the corresponding 3-keto-pregnane and 3-hydroxy pregnane compounds.

It is now discovered that the selective $\Delta^1$ dehydrogenation of steroid compounds can be accomplished by a novel microbiological dehydrogenation procedure which comprises contacting a steroid compound, in particular a C-5 unsaturated 3-oxygenated steroid compound, with the dehydrogenating activity of microorganisms of the genus Nocardia, preferably microorganisms belonging to the species *Nocardia blackwellii, Nocardia asteroides, Nocardia minima, Nocardia globerula, Nocardia leishmanii, Nocardia formica, Nocardia convoluta,* and *Nocardia corallina*. These Nocardia microorganisms can be obtained from known sources such as the American Type Culture Collection, Washington, D.C., or they may be isolated from natural sources, such as soil or disease processes, by known methods.

The dehydrogenation can be effected by contacting the steroid compound with the Nocardia microorganisms themselves or, if preferred, with enzyme systems of the Nocardia microorganisms whereby the hydrogen attached to the C-1 and C-2 carbon atoms is selectively removed to produce the desired $\Delta^1$-steroid substantially uncontaminated by unwanted by-products. When a $\Delta^4$-3-keto-pregnene compound is subjected to the dehydrogenating activity of Nocardia microorganisms the corresponding $\Delta^{1,4}$-pregnadiene compound is obtained directly and in high yield.

While this novel microbiological dehydrogenation method is applicable for the $\Delta^1$ dehydrogenation of 3-keto-steroid compounds generally irrespective of the substituents attached to, or degree of unsaturation in, rings B, C and D, it is ordinarily preferred to utilize, as starting materials in this method, C-5 unsaturated 3-oxygenated-steroid compounds of the pregnane series as for example $\Delta^4$-3-keto-pregnene compounds such as $\Delta^4$-pregnene-3,20-dione,
$\Delta^4$-pregnene-3,20-dione-17$\alpha$-ol,
$\Delta^4$-pregnene-3,20-dione-21-ol,
$\Delta^4$-pregnene-3,20-dione-21-ol 21-acylate,
$\Delta^4$-pregnene-3,20-dione-21-ol 21 acetate,
$\Delta^4$-pregnene-3,20-dione-17$\alpha$,21diol,
$\Delta^4$-pregnene-3,20-dione-17,21-diol 21-acylate,
$\Delta^4$-pregnene-3,20-dione-17$\alpha$,21-diol 21-acetate,
$\Delta^4$-pregnene-3,20-dione-17$\alpha$-ol-21-al,
$\Delta^4$-pregnene-3,11,20-trione,
$\Delta^4$-pregnene-3,11,20-trione-17$\alpha$-ol,
$\Delta^4$-pregnene-3,11,20-trione-21-ol,
$\Delta^4$-pregnene-3,11,20-trione-21-ol 21-acylate,
$\Delta^4$-pregnene-3,11,20-trione-21-ol 21-acetate,
$\Delta^4$-pregnene-3,11,20-trione-17$\alpha$,21-diol,
$\Delta^4$-pregnene-3,11,20-trione-17,21-diol 21-acylate,
$\Delta^4$-pregnene,3,11,20-trione-17$\alpha$,21-diol 21-acetate,
$\Delta^4$-pregnene-3,11,20-trione-17$\alpha$-ol-21-al,
$\Delta^4$-pregnene-3,20-dione-11$\beta$,21-ol,
$\Delta^4$-pregnene-3,20-dione-11$\beta$-diol,
$\Delta^4$-pregnene-3,20-dione-11,21-diol 21-acylate,
$\Delta^4$-pregnene-3,20-dione-11$\beta$,21-diol 21-acetate,
$\Delta^4$-pregnene-3,20-dione-11$\beta$-ol-21-al,
$\Delta^4$-pregnene-3,20-dione-11$\beta$,17$\alpha$-diol,
$\Delta^4$-pregnene-3,20-dione-11$\beta$,17$\alpha$,21-triol,
$\Delta^4$-pregnene-3,20-dione-11,17,21-triol 21-acylate,
$\Delta^4$-pregnene-3,20-dione-11$\beta$,17$\alpha$-diol-21-al,
$\Delta^4$-pregnene-3,20-dione-11$\beta$,17$\alpha$,21-triol-21-acetate, 9-halo-derivatives of these $\Delta^4$-3-keto-pregnene compounds such as 9-halo-$\Delta^4$-pregnene-3,20-dione-17,21-diol,
9-fluoro-$\Delta^4$-pregnene-3,20-dione-17$\alpha$,21-diol,
9-halo-$\Delta^4$-pregnene-3,20-dione-17,21-diol 21-acylate,
9-fluoro-$\Delta^4$-pregnene-3,20-dione-17$\alpha$,21-diol 21-acetate,
9-halo-$\Delta^4$-pregnene-3,11,20-trione-17,21- diol,
9-fluoro-$\Delta^4$-pregnene-3,11,20-trione-17$\alpha$,21-diol,
9-halo-$\Delta^4$-pregnene-3,11,20-trione-17,21-diol 21-acylate,
9-fluoro - $\Delta^4$ - pregnene-3,11,20-trione-17$\alpha$,21-diol 21-acetate,
9-halo-$\Delta^4$-pregnene-3,20-dione-11,17,21-triol,
9-fluoro-$\Delta^4$-pregnene-3,20-dione-11$\beta$,17$\alpha$,21-triol,
9-halo-$\Delta^4$-pregnene-3,20-dione-11,17,21-triol 21-acylate,
9 - fluoro-$\Delta^4$-pregnene-3,20-dione-11$\beta$,17$\alpha$,21-triol 21-acetate, and the like. Instead of $\Delta^4$-3-keto-pregnene compounds, I may employ as starting materials other C-5 unsaturated 3-oxygenated-steroid compounds as for example $\Delta^5$-3-hydroxy-pregnene compounds such as $\Delta^5$-pregnene-20-one-3-ol,
$\Delta^5$-pregnene-20-one-3,17$\alpha$-diol,
$\Delta^5$-pregnene-20-one-3,21-diol,
$\Delta^5$-pregnene-20-one-3,21-diol 21-acylate,
$\Delta^5$-pregnene-20-one-3,21-diol 21 acetate,
$\Delta^5$-pregnene-20-one-3,17$\alpha$,21-triol,
$\Delta^5$-pregnene-20-one-3,17,21-triol 21-acylate,
$\Delta^5$-pregnene-21-one-17$\alpha$,21-triol 21-acetate,
$\Delta^5$-pregnene-11,20-dione-3-ol,
$\Delta^5$-pregnene-11,20-dione-3,17$\alpha$-diol,
$\Delta^5$-pregnene-11,20-dione-3,21-diol,
$\Delta^5$-pregnene-11,20-dione-3,21-diol 21-acylate,
$\Delta^5$-pregnene-11,20-dione-3,2-diol 21-acetate, $\Delta^5$-pregnene-11,20-dione-3,17$\alpha$,21-triol,
$\Delta^5$-pregnene-11,20-dione-3,17,21-triol 21-acylate,
$\Delta^5$-pregnene-11,20-dione-3,17$\alpha$,21-triol 21-acetate,
$\Delta^5$-pregnene-20-one-3,11$\beta$-diol,
$\Delta^5$-pregnene-20-one-3,11$\beta$,21-triol,
$\Delta^5$-pregnene-20-one-3,11,21-triol 21-acylate,
$\Delta^5$-pregnene-20-one-3,11$\beta$,21-triol 21-acetate,
$\Delta^5$-pregnene-20-one-3,11$\beta$,17$\alpha$-triol,
$\Delta^5$-pregnene-20-one-3,11$\beta$,17$\alpha$,21-tetrol,
$\Delta^5$-pregnene-20-one-3,11,17,21-tetrol 21-acylate,
$\Delta^5$-pregnene-20-one-3,11$\beta$,17$\alpha$,21-tetrol 21-acetate,
9-halo-derivatives of these $\Delta^5$-3-hydroxy-pregnene compounds such as
9-halo-$\Delta^5$-pregnene-20-one-3,17,21-triol,
9-fluoro-$\Delta^5$-pregnene-20-one-3,17$\alpha$,21-triol,
9-halo-$\Delta^5$-pregnene-20-one-3,17,21-triol 21-acylate,
9-fluoro-$\Delta^5$-pregnene-20-one-3,17$\alpha$,21-triol 21-acetate,
9-halo-$\Delta^5$-pregnene-11,20-dione-3,17,21-triol,
9-fluoro-$\Delta^5$-pregnene-11$\beta$,20-dione-3,17$\alpha$,21-triol,
9-halo-$\Delta^5$-pregnene-11,20-dione-3,17,21-triol 21-acylate,
9-fluoro-$\Delta^5$-pregnene-11$\beta$,20-dione-3,17$\alpha$,21-triol 21-acetate,
9-halo-$\Delta^5$-pregnene-20-one-3,11,17,21-tetrol,
9-fluoro-$\Delta^5$-pregnene-20-one-3,11$\beta$,17$\alpha$,21-tetrol,
9-halo-$\Delta^5$-pregnene-20-one-3,11,17,21-tetrol 21-acylate,
9-fluoro-$\Delta^5$-pregnene-20-one-3,11$\beta$,17$a$,21-tetrol 21-acetate,
$\Delta^5$-3-(lower alkanoyloxy) pregnene compounds such as
$\Delta^5$-pregnene-20-one-3-ol 3-(lower alkanoate),
$\Delta^5$-pregnene-20-one-3-ol 3-acetate,
$\Delta^5$-pregnene-20-one-3,17-diol 3-(lower alkanoate),
$\Delta^5$-pregnene-20-one-3,17$\alpha$-diol 3-acetate,
$\Delta^5$-pregnene-20-one-3,21-diol 3-(lower alkanoate),
$\Delta^5$-pregnene-20-one-3,21-diol 3-acetate,
$\Delta^5$-pregnene-20-one-3,21-diol 3,21-bis(lower alkanoate),
$\Delta^5$-pregnene-20-one-3,21-diol 3,21-diacetate,
$\Delta^5$-pregnene-20-one-3,17,21-triol 3-(lower alkanoate),
$\Delta^5$-pregnene-20-one-3,17$\alpha$,21-triol 3-acetate,
$\Delta^5$-pregnene-20-one-3,17,21-triol 3,21-bis(lower alkanoate),
$\Delta^5$-pregnene-20-one-3,17$a$,21-triol 3,21-diacetate,
$\Delta^5$-pregnene-11,20-dione-3-ol 3-(lower alkanoate),
$\Delta^5$-pregnene-11,20-dione-3-ol 3-acetate,
$\Delta^5$-pregnene-11,20-dione-3,17-diol 3-(lower alkanoate),
$\Delta^5$-pregnene-11,20-dione-3,17$\alpha$-diol 3-acetate,
$\Delta^5$-pregnene-11,20-dione-3,21-diol 3-(lower alkanoate),
$\Delta^5$-pregnene-11,20-dione-3,21-diol 3-acetate,
$\Delta^5$-pregnene-11,20-dione-3,21-diol 3,21-bis(lower alkanoate),
$\Delta^5$-pregnene-11,20-dione-3,21-diol 3,21-diacetate,
$\Delta^5$-pregnene-11,20-dione-3,17,21-triol 3-(lower alkanoate),
$\Delta^5$-pregnene-11,20-dione-3,17$\alpha$,21-triol 3-acetate,
$\Delta^5$-pregnene-11,20-dione-3,17,21-triol 3,21-bis(lower alkanoate),
$\Delta^5$-pregnene-11,20-dione-3,17$\alpha$,21-triol 3,21-diacetate,
$\Delta^5$-pregnene-20-one-3,11-diol 3-(lower alkanoate),
$\Delta^5$-pregnene-20-one-3,11$\beta$-diol 3-acetate,
$\Delta^5$-20-one-3,11,17-triol 3-(lower alkanoate),
$\Delta^5$-20-one-3,11$\beta$,17$\alpha$-triol 3-acetate,
$\Delta^5$-pregnene-20-one-3,11,21-triol 3-(lower alkanoate),
$\Delta^5$-pregnene-20-one-3,11$\beta$,21-triol 3-acetate,
$\Delta^5$-pregnene-20-one-3,11,21-triol 3,21-bis(lower alkanoate),
$\Delta^5$-pregnene-20-one-3,11$\beta$,21-triol 3,21-diacetate,
$\Delta^5$-pregnene-20-one-3,11$\alpha$,17,21-tetrol 3-(lower alkanoate),
$\Delta^5$-pregnene-20-one-3,11$\beta$,17$\alpha$,21-tetrol 3-acetate,
$\Delta^5$-pregnene-20-one-3,11,17,21-tetrol 3,21-bis(lower alkanoate),
$\Delta^5$-pregnene-20-one-3,11$\beta$,17$\alpha$,21-tetrol 3,21-diacetate,
9-halo derivatives of these $\Delta^5$-3-(lower alkanoyloxy)-pregnene compounds such as
9-halo-$\Delta^5$-pregnene-20-one-3,17,21-triol 3-(lower alkanoate),
9-fluoro-$\Delta^5$-pregnene-20-one-3,17$\alpha$,21-triol 3-acetate,
9-halo-$\Delta^5$-pregnene-11,20-dione-3,17,21-triol 3-(lower alkanoate),
9-fluoro-$\Delta^5$-pregnene-11,20-dione-3,17$\alpha$,21-triol 3-acetate,
9-halo-$\Delta^5$-pregnene-11,20-dione-3,17,21-triol 3,21-bis-(lower alkanoate),
9-fluoro-$\Delta^5$-pregnene-11,20-dione-3,17$a$,21-triol-3,21-diacetate,
9-halo-$\Delta^5$-pregnene-20-one-3,11,17,21-tetrol 3-(lower alkanoate),
9-fluoro-$\Delta^5$-pregnene-20-one-3,11$\beta$,17$\alpha$,21-tetrol 3-acetate,
9-halo-$\Delta^5$-pregnene-20-one-3,11,17,21-tetrol 3,21-bis-lower alkanoate),
9-fluoro-$\Delta^5$-pregnene-20-one-3,11$\beta$,17$\alpha$,21-tetrol 3,21-diacetate,
and the like. These $\Delta^5$-3-oxygenated-pregnene compound starting materials are converted by the dehydrogenating activity of these Nocardia microorganisms directly to the corresponding $\Delta^{1,4}$-3-keto-pregnadiene compounds, which conversion may occur, it is believed, through the intermediate formation of the $\Delta^4$-3-keto- compound. In the foregoing starting materials, the preferred ester substituent in the 3 and/or 21-position is ordinarily the acetate although other lower hydrocarbon carboxylic acid esters such as propionate, butyrate, tertiary butyl acetate, benzoate, and the like may be employed instead of the acetate if desired. Instead of these C-5 unsaturated 3-oxygenated-pregnene compounds, I can also utilize as starting materials 3-keto-pregnane compounds or 3-hydroxy-pregnane or 3-hydroxy allopregnane compounds which are selectively dehydrogenated by the Nocardia microorganisms to produce $\Delta^1$ and $\Delta^4$ unsaturation (and in the case of the 3-hydroxy-pregnane compounds, oxidizing the 3-hydroxy radical to a 3-keto substituent), thereby forming the corresponding $\Delta^{1,4}$-3-keto-pregnadiene compound. The 3-keto-pregnanes and 3-hydroxy pregnanes which I ordinarily employ as starting materials for this microbiological dehydrogenated method using Nocardia microorganisms include pregnane-3-20-dione, pregnane-3,20-dione-17$\alpha$-ol, pregnane-3,20-dione-21-ol, pregnane-3,20 - dione - 17$\alpha$,21-diol, pregnane - 3,11,20 - trione, pregnane-3,11,20-trione - 17$\alpha$-ol, pregnane-3,11,20-trione-21-ol, pregnane-3,11,20-trione-17$\alpha$,21-diol, pregnane-3,20-dione-11$\beta$-ol, pregnane-3,20-dione-11$\beta$,17$\alpha$-diol, pregnane-3,20-dione-11$\beta$,21 - diol, pregnane-3,20-dione-11$\beta$,17$\alpha$,21-triol, pregnane-20-one-3-ol, pregnane-20-one-3,17$\alpha$-diol, pregnane - 20 - one - 3-21-diol, pregnane-20-one-3,17$\alpha$,21-triol, pregnane-11,20-dione-3-ol, pregnene-11,20-dione-3,17$\alpha$ - diol, pregnane-11,20-dione-3,21-diol, pregnane-11,20-dione-3,17$\alpha$,21-triol, pregnane - 20 - one-3,11$\beta$-diol, pregnane-20-one-3,11$\beta$,17$\alpha$-triol, pregnane-20 - one-3,11$\beta$,21-triol, pregnane-20-one-3,11$\beta$,17$\alpha$,21-tetrol and, for those starting materials enumerated hereinabove which contain hydroxy radicals in the 3- and/or 21-positions, 3- and/or 21 esters thereof with lower hydrocarbon carboxylic acids such as acetic acid, propionic acid, tertiary butyl-acetic acid, benzoic acid, and the like.

The presently-invented microbiological dehydrogenation procedure is conducted by contacting the 3-oxygenated-steroid compound with the dehydrogenating activity of Nocardia microorganisms. This can be effected by adding the steroid compound as a solid, or as a solution in a solvent as for example a dialkyl ketone such as acetone, a dialkyl-formamide such as dimethyl-formamide, and the like, under sterile conditions to a culture of the microorganism in a nutrient medium and agitating the resulting mixture thereby bringing about growth of the microorganism and dehydrogenation of the steroid compound. The steroid can be added at the time the nutrient medium is inoculated with the culture of Nocardia microorganisms or, alternatively, may be added to an established culture. Instead of adding the steroid compound to the established culture in the nutrient medium, the cell growth from such established culture may be filtered from the broth, washed with distilled water, then suspended in buffered aqueous solution containing the 3-oxygenated-steroid compound, and the resulting mixture agitated thereby effecting dehydrogenation of the steroid compound to form the corresponding $\Delta^1$-3-oxygenated-steroid. The latter is more readily recovered from this medium than from the mixture obtained when the steroid is incubated with the microorganism in the original nutrient medium; also higher yields of $\Delta^1$-steroids are obtained with this medium when 3-hydroxy-pregnanes are used as starting materials. Alternatively, the 3-oxygenated-steroid compound may be contacted with dehydrogenating enzyme preparations from the growth of Nocardia microorganisms, thereby forming the corresponding $\Delta^1$-3-oxygenated-steroid compound.

The nutrient mediums used in carrying out this microbiological dehydrogenation are those ordinarily utilized in the propagation of Nocardia microorganisms. The usual nutrients include a nitrogen and carbon source, inorganic salts and growth factors when required. The carbon can be provided by compounds such as acetates, lactates, which provides increased growth and higher yields in the case of certain species such as *Nocardia blackwellii,* and the like. The nitrogen can be provided by an ammonium salt, amino acids, or proteins such as soy beans, oats, yeast, yeast extracts, tryptic digest of casein, meat extract, blood meal, protein meat and bone scrap, salmon meal, fish meals, fish solubles, distillers solubles, and the like. If desired, the Nocardia microorganisms can be propagated using proteins (or amino acids) without any carbohydrate being present in the medium, in which case the proteins or amino acids serve as the source of both the carbon and nitrogen required by the microorganisms.

While, as noted hereinabove, the dehydrogenation of the 3-oxygenated-steroid compound may be carried out using dehydrogenating enzyme preparations from the growth of Nocardia microorganisms, or by contacting the steroid compound with a suspension of an established culture in distilled water, it is ordinarily preferred to add the 3-oxygenated-steroid compound to a nutrient medium containing a 24-hour growth of Nocardia microorganisms. The proportion of steroid compound which may be added to the medium varies depending upon the particular substrate being dehydrogenated, but it is ordinarily preferred to employ a concentration of about 0.005% to 0.2% of 3-oxygenated-steroid compound, although higher or lower concentrations may be employed, if desired. The culture containing the added 3-oxygenated-steroid compound is then incubated, preferably with agitation and aeration for an additional period which ordinarily varies between about 10 hours and 50 hours although shorter or longer fermentation times may be advantageous for the dehydrogenation of particular 3-keto-steroid substrates. In view of the fact that prolonged fermentations may result in destruction of a portion of the $\Delta^1$-3-keto-steroid product, it is ordinarily preferred to employ a fermentation time of about 10 hours to 24 hours which, depending upon the steroid substrate, has been found to result in maximal yields of the $\Delta^1$-dehydrogenated steroid product.

After completion of the dehydrogenation process, the product is conveniently recovered from the fermented broth by extraction with a water-immiscible solvent as for example a chlorinated hydrocarbon such as chloroform, a ketone such as methyl isobutyl ketone, an alkyl alkanoate such as ethyl acetate, and the like. The extract of $\Delta^1$-dehydrogenated steroid product and any unreacted starting material which may be present is conveniently purified by chromatography using silica gel, activated alumina, and the like or, if desired by means of descending paper chromatograms. After separation of the dehydrogenated product from unreacted starting material, the product can be purified further, if desired by recrystallization from a solvent such as ethyl acetate, ethyl acetate-petroleum ether, and the like.

In accordance with this microbiological dehydrogenation method, and utilizing the C-5 unsaturated 3-oxygenated-steroid compounds, 3-keto-pregnane compounds and 3-hydroxy-pregnane compounds enumerated hereinabove, there are obtained $\Delta^{1,4}$-3-keto-pregnadiene compounds such as $\Delta^{1,4}$-pregnadiene-3,20-dione, $\Delta^{1,4}$-pregnadiene-3,20-dione-17$\alpha$-ol, $\Delta^{1,4}$-pregnadiene-3,20-dione-21-ol, $\Delta^{1,4}$-pregnadiene-3,20-dione-17$\alpha$,21-diol, $\Delta^{1,4}$-pregnadiene-3,20-dione-17$\alpha$-ol-21-al, $\Delta^{1,4}$-pregnadiene-3,11,20-trione, $\Delta^{1,4}$-pregnadiene-3,11,20-trione-17$\alpha$-ol, $\Delta^{1,4}$-pregnadiene-3,11,20-trione-21-ol, $\Delta^{1,4}$-pregnadiene-3,11,20-trione-17$\alpha$,21-diol, $\Delta^{1,4}$-pregnadiene-3,11,20-trione-17$\alpha$-ol-21-al, $\Delta^{1,4}$-pregnadiene-3,20-dione-11$\beta$-ol, $\Delta^{1,4}$-pregnadiene-3,20-dione-11$\beta$-ol-21-al, $\Delta^{1,4}$-pregnadiene-3,20-dione-11$\beta$,21-diol, $\Delta^{1,4}$-pregnadiene-3,20-dione-11$\beta$,17$\alpha$-diol, $\Delta^{1,4}$-pregnadiene-3,20-dione-11$\beta$,17$\alpha$,21-triol, 9-halo-$\Delta^{1,4}$-3-keto-pregnadiene compounds such as 9-halo-$\Delta^{1,4}$-pregnadiene-3,20-dione-17,21-diol, 9-fluoro-$\Delta^{1,4}$-pregnadiene-3,20-dione-17$\alpha$,21-diol, 9-halo-$\Delta^{1,4}$-pregnadiene-3,20-dione-17,11,21-triol, 9-halo-$\Delta^{1,4}$-pregnadiene-3,11,20-trione-17,21-diol, 9-fluoro-$\Delta^{1,4}$-pregnadiene-3,11,20-trione-17$\alpha$,21-diol, 9-fluoro-$\Delta^{1,4}$-pregnadiene-3,20-dione-11$\beta$,17$\alpha$,21-triol or the corresponding $\Delta^4$-pregnene compounds, and the like.

The following examples illustrate methods of carrying out the present invention but it is to be understood that these examples are given for purposes of illustration and not of limitation.

EXAMPLE 1

Fifty milliliters of a nutrient medium are prepared having the following composition:

| | | |
|---|---|---|
| Cerelose | g | 1 |
| Edamin | g | 1 |
| Cornsteep liquor | ml | 0.25 |

Distilled water to make 50 ml.

This medium is adjusted to pH 6.5 with KOH, sterilized and inoculated with about 2.5 to 5 ml. of a culture of *Nocardia asteroides* (MA 272; ATCC 9970) microorganisms, and the inoculated culture is then incubated at a temperature of 28° C., with agitation, for a 48-hour period. To the resulting culture is added a solution containing 10 mg. of hydrocortisone ($\Delta^4$-pregnene-11$\beta$,17$\alpha$,21-triol-3,20-dione) dissolved in 0.1 ml. of dimethylformamide. The culture containing the steroid compound is incubated, with agitation, for an additional period of about 24 hours at 28° C.

The fermentation broth is extracted with four 50 ml.-portions of ethyl acetate, and the ethyl acetate extracts are combined and evaporated in vacuo to a volume of about 5 ml. The concentrated solution is then used to prepare streak-paper chromatograms which are developed utilizing formamide as the stationary liquid phase and chloroform as the mobile liquid phase. Two bands are secured, one of which (corresponding to the more mobile component) shows the ultra-violet adsorption maximum characteristic of hydrocortisone, and the other (the less mobile component) shows an ultra-violet adsorption maximum at about 242 mu. The paper chromatograms is dried, and the band corresponding to the 242 mu adsorption is cut off and extracted with methanol. The material extracted with methanol is again subjected to streak-paper chromatography, using paper which has been extracted for 48 hours with methanol, and emptying the chloroform-formamide system previously employed. The resulting chromatogram shows only a trace band corresponding to the hydrocortisone starting material with the major band having an ultra-violet adsorption maximum at 242 mu. The paper chromatogram is thoroughly dried, and the band corresponding to the 242 mu adsorption maximum is cut off and extracted with methanol. The methanol extract is evaporated to dryness in vacuo to give $\Delta^{1,4}$-pregnadiene-11$\beta$,17$\alpha$21-triol-3,20-dione.

EXAMPLE 2

Fifty milliliters of a nutrient medium are prepared having the following composition:

| | |
|---|---|
| Cerelose | g 1 |
| Edamin | g 1 |
| Cornsteep liquor | ml 0.25 |
| Distilled water to make 50 ml. | |

This medium is adjusted to pH 6.5 with KOH, sterilized and inoculated with about 2.5 to 5 ml. of a culture of *Nocardia minima* (MA 292; ATCC 8674) microorganisms, and the inoculated culture is then incubated at a temperature of 28° C., with agitation, for a 48-hour period. To the resulting culture is added a solution containing 10 mg. of hydrocortisone ($\Delta^4$-pregnene-11$\beta$,17$\alpha$,21-triol-3,20-dione) dissolved in 0.1 ml. of dimethylformamide. The culture containing the steroid compound is incubated, with agitation, for an additional period of about 24 hours at 28° C.

The fermentation broth is extracted with four 50 ml.-portions of ethyl acetate, and the ethyl acetate extracts are combined and evaporated in vacuo to a volume of about 5 ml. The concentrated solution is then used to prepare streak-paper chromatograms which are developed utilizing formamide as the stationary liquid phase and chloroform as the mobile liquid phase. Two bands are secured, one of which (corresponding to the more mobile component) shows the ultra-violet adsorption maximum characteristic of hydrocortisone, and the other (the less mobile component) shows an ultra-violet adsorption maximum at about 242 mu. The paper chromatogram is dried, and the band corresponding to the 242 mu adsorption is cut off and extracted with methanol. The material extracted with methanol is again subjected to streak-paper chromatography, using paper which has been extracted for 48 hours with methanol, and employing the chloroform-formamide system previously employed. The resulting chromatogram shows only a trace band corresponding to the hydrocortisone starting material with the major band having an ultra-violet adsorption maximum at 242 mu. The paper chromatogram is thoroughly dried, and the band corresponding to the 242 mu. adsorption maximum is cut off and extracted with methanol. The methanol extract is evaporated to dryness in vacuo to give $\Delta^{1,4}$-pregnadiene-11$\beta$,17$\alpha$,21-triol-3,20-dione.

EXAMPLE 3

Fifty milliliters of a nutrient medium are prepared having the following composition:

| | |
|---|---|
| Cerelose | g 1 |
| Edamin | g 1 |
| Cornsteep liquor | ml 0.25 |
| Distilled water to make 50 ml. | |

This medium is adjusted to pH 6.5 with KOH, sterilized and inoculated with about 2.5 to 5 ml. of a culture of *Nocardia asteroides* (MA 289; ATCC 10904) microorganisms, and the inoculated culture is then incubated at a temperature of 28° C., with agitation, for a 48-hour period. To the resulting culture is added a solution containing 10 mg. of hydrocortisone ($\Delta^4$-pregnene-11$\beta$,17$\alpha$,21-triol-3,20-dione) dissolved in 0.1 ml. of dimethylformamide. The culture containing the steroid compound is incubated, with agitation, for an additional period of about 24 hours at 28° C.

The fermentation broth is extracted with four 50 ml.-portions of ethyl acetate, and the ethyl acetate extracts are combined and evaporated in vacuo to a volume of about 5 ml. The concentrated solution is then used to prepare streak-paper chromatograms which are developed utilizing formamide as the stationary liquid phase and chloroform as the mobile liquid phase. Two bands are secured, one of which (corresponding to the more mobile component) shows the ultra-violet adsorption maximum characteristic of hydrocortisone, and the other (the less mobile component) shows an ultra-violet adsorption maximum at about 242 mu. The paper chromatogram is dried, and the band corresponding to the 242 mu adsorption is cut off and extracted with methanol. The material extracted with methanol is again subjected to streak-paper chromatography, using paper which has been extracted for 48 hours with methanol, and employing the chloroform-formamide system previously employed. The resulting chromatogram shows only a trace band corresponding to the hydrocortisone starting material with the major band having an ultra-violet adsorption maximum at 242 mu. The paper chromatogram is thoroughly dried, and the band corresponding to the 242 mu adsorption maximum is cut off and extracted with methanol. The methanol extract is evaporated to dryness in vacuo to give $\Delta^{1,4}$-pregnadiene-11$\beta$,17$\alpha$,21-triol-3,20-dione.

EXAMPLE 4

Fifty milliliters of a nutrient medium are prepared having the following composition:

| | |
|---|---|
| Cerelose | g 1 |
| Edamin | g 1 |
| Cornsteep liquor | ml 0.25 |
| Distilled water to make 50 ml. | |

This medium is adjusted to pH 6.5 with KOH, sterilized and inoculated with about 2.5 to 5 ml. of a culture of *Nocardia globerula* (MA 280; ATCC 9356) microorganisms, and the inoculated culture is then incubated at a temperature of 28° C., with agitation, for a 48-hour period. To the resulting culture is added a solution containing 10 mg. of hydrocortisone ($\Delta^4$-pregnene-11$\beta$,17$\alpha$,21-triol-3,20-dione) dissolved in 0.1 ml. of dimethylformamide. The culture containing the steroid compound is incubated, with agitation, for an additional period of about 24 hours at 28° C.

The fermentation broth is extracted with four 50 ml.-portions of ethyl acetate, and the ethyl acetate extracts are combined and evaporated in vacuo to a volume of about 5 ml. The concentrated solution is then used to prepare streak-paper chromatograms which are developed utilizing formamide as the stationary liquid phase and chloroform as the mobile liquid phase. Two bands are secured, one of which (corresponding to the more mobile component) shows the ultra-violet adsorption maximum characteristic of hydrocortisone, and the other (the less mobile component) shows an ultra-violet adsorption maximum at about 242 mu. The paper chromatogram is dried, and the band corresponding to the 242 mu adsorption is cut off and extracted with methanol. The material extracted with methanol is again subjected to streak-paper chromatography, using paper which has been extracted for 48 hours with methanol, and employing the chloroform-formamide system previously employed. The resulting chromatogram shows only a trace band corresponding to the hydrocortisone starting material with the major band having an ultra-violet adsorption maximum at 242 mu. The paper chromatogram is thoroughly dried, and the band corresponding to the 242 mu adsorption maximum is cut off and extracted with methanol. The methanol extract is evaporated to dryness in vacuo to give $\Delta^{1,4}$-pregnadiene-11$\beta$,17$\alpha$,21-triol-3,20-dione.

EXAMPLE 5

Fifty milliliters of a nutrient medium are prepared having the following composition:

| | |
|---|---|
| Cerelose | g 1 |
| Edamin | g 1 |
| Cornsteep liquor | ml 0.25 |
| Distilled water to make 50 ml. | |

This medium is adjusted to pH 6.5 with KOH, sterilized and inoculated with about 2.5 to 5 ml. of a culture of *Nocardia leishmanii* (MA 281; ATCC 6855) microorganisms, and the inoculated culture is then incubated at a temperature of 28° C., with agitation, for a 48-hour period. To the resulting culture is added a solution containing 10 mg. of hydrocortisone ($\Delta^4$-pregnene-11$\beta$,17$\alpha$,21-triol-3,20-dione) dissolved in 0.1 ml. of dimethylformamide. The culture containing the steroid compound is incubated, with agitation, for an additional period of about 24 hours at 28° C.

The fermentation broth is extracted with four 50 ml.-portions of ethyl acetate, and the ethyl acetate extracts are combined and evaporated in vacuo to a volume of about 5 ml. The concentrated solution is then used to prepare streak-paper chromatograms which are developed utilizing formamide as the stationary liquid phase and chloroform as the mobile liquid phase. Two bands are secured, one of which (corresponding to the more mobile component) shows the ultra-violet adsorption maximum characteristic of hydrocortisone, and the other (the less mobile component) shows an ultra-violet adsorption maximum at about 242 mu. The paper chromatogram is dried, and the band corresponding to the 242 mu adsorption is cut off and extracted with methanol. The material extracted with methanol is again subjected to streak-paper chromatography, using paper which has been extracted for 48 hours with methanol, and employing the chloroform-formamide system previously employed. The resulting chromatogram shows only a trace band corresponding to the hydrocortisone starting material with the major band having an ultra-violet adsorption maximum at 242 mu. The paper chromatogram is thoroughly dried, and the band corresponding to the 242 mu adsorption maximum is cut off and extracted with methanol. The methanol extract is evaporated to dryness in vacuo to give $\Delta^{1,4}$-pregnadiene-11$\beta$,17$\alpha$,21-triol-3,20-dione.

EXAMPLE 6

Fifty milliliters of a nutrient medium are prepared having the following composition:

Cerelose _____g__ 1
Edamin _____g__ 1
Cornsteep liquor_____ml__ 0.25
Distilled water to make 50 ml.

This medium is adjusted to pH 6.5 with KOH, sterilized and inoculated with about 2.5 to 5 ml. of a culture of *Nocardia formica* (MA 143; NRRL 2470) microorganisms, and the inoculated culture is then incubated at a temperature of 28° C., with agitation, for a 48-hour period. To the resulting culture is added a solution containing 10 mg. of hydrocortisone ($\Delta^4$-pregnene-11$\beta$,17$\alpha$,21-triol-3,20-dione) dissolved in 0.1 ml. of dimethylformamide. The culture containing the steroid compound is incubated, with agitation, for an additional period of about 24 hours at 28° C.

The fermentation broth is extracted with four 50 ml.-portions of ethyl acetate, and the ethyl acetate extracts are combined and evaporated in vacuo to a volume of about 5 ml. The concentrated solution is then used to prepare streak-paper chromatograms which are developed utilizing formamide as the stationary liquid phase and chloroform as the mobile liquid phase. Two bands are secured, one of which (corresponding to the more mobile component) shows the ultra-violet adsorption maximum characteristic of hydrocortisone, and the other (the less mobile component) shows an ultra-violet adsorption maximum at about 242 mu. The paper chromatogram is dried, and the band corresponding to the 242 mu adsorption is cut off and extracted with methanol. The material extracted with methanol is again subjected to streak-paper chromatography, using paper which has been extracted for 48 hours with methanol, and employing the chloroform-formamide system previously employed. The resulting chromatogram shows only a trace band corresponding to the hydrocortisone starting material with the major band having an ultra-violet adsorption maximum at 242 mu. The paper chromatogram is thoroughly dried, and the band corresponding to the 242 mu adsorption maximum is cut off and extracted with methanol. The methanol extract is evaporated to dryness in vacuo to give $\Delta^{1,4}$-pregnadiene-11$\beta$,17$\alpha$,21-triol-3,20-dione.

EXAMPLE 7

Fifty milliliters of a nutrient medium are prepared having the following composition:

Cerelose _____g__ 1
Edamin _____g__ 1
Cornsteep liquor_____ml__ 0.25
Distilled water to make 50 ml.

This medium is adjusted to pH 6.5 with KOH, sterilized and inoculated with about 2.5 to 5 ml. of a culture of *Nocardia convoluta* (MA 275; ATCC 4275) microorganisms, and the inoculated culture is then incubated at a temperature of 28° C., with agitation, for a 48-hour period. To the resulting culture is added a solution containing 10 mg. of hydrocortisone ($\Delta^4$-pregnene-11$\beta$,17$\alpha$,21-triol-3,20-dione) dissolved in 0.1 ml. of dimethylformamide. The culture containing the steroid compound is incubated, with agitation, for an additional period of about 24 hours at 28° C.

The fermentation broth is extracted with four 50 ml.-portions of ethyl acetate, and the ethyl acetate extracts are combined and evaporated in vacuo to a volume of about 5 ml. The concentrated solution is then used to prepare streak-paper chromatograms which are developed utilizing formamide as the stationary liquid phase and chloroform as the mobile liquid phase. Two bands are secured, one of which (corresponding to the more mobile component) shows the ultra-violet adsorption maximum characteristic of hydrocortisone, and the other (the less mobile component) shows an ultra-violet adsorption maximum at about 242 mu. The paper chromatogram is dried, and the band corresponding to the 242 mu adsorption is cut off and extracted with methanol. The material extracted with methanol is again subjected to streak-paper chromatography, using paper which has been extracted for 48 hours with methanol, and employing the chloroform-formamide system previously employed. The resulting chromatogram shows only a trace band corresponding to the hydrocortisone starting material with the major band having an ultra-violet adsorption maximum at 242 mu. The paper chromatogram is thoroughly dried, and the band corresponding to the 242 mu adsorption maximum is cut off and extracted with methanol. The methanol extract is evaporated to dryness in vacuo to give $\Delta^{1,4}$-pregnadiene-11$\beta$,17$\alpha$,21-triol-3,20-dione.

EXAMPLE 8

Fifty milliliters of a nutrient medium are prepared having the following composition:

Cerelose _____g__ 1
Edamin _____g__ 1
Cornsteep liquor_____ml__ 0.25
Distilled water to make 50 ml.

This medium is adjusted to pH 6.5 with KOH, sterilized and inoculated with about 2.5 to 5 ml. of a culture of *Nocardia corallina* (MA 277; ATCC 4273) microorganisms, and the inoculated culture is then incubated at a temperature of 28° C., with agitation, for a 48-hour period. To the resulting culture is added a solution containing 10 mg. of hydrocortisone ($\Delta^4$-pregnene-11$\beta$,17$\alpha$,21-triol-3,20-dione) dissolved in 0.1 ml. of dimethylformamide. The culture containing the steroid compound is incubated, with agitation, for an additional period of about 24 hours at 28° C.

The fermentation broth is extracted with four 50 ml.-portions of ethyl acetate, and the ethyl acetate extracts are combined and evaporated in vacuo to a volume of about 5 ml. The concentrated solution is then used to prepare streak-paper chromatograms which are developed utilizing formamide as the stationary liquid phase and chloroform as the mobile liquid phase. Two bands are secured, one of which (corresponding to the more mobile component) shows the ultra-violet adsorption maximum characteristic of hydrocortisone, and the other (the less mobile component) shows an ultra-violet adsorption maximum at about 242 mu. The paper chromatogram is dried, and the band corresponding to the 242 mu adsorption is cut off and extracted with methanol. The material extracted with methanol is again subjected to streak-paper chromatography, using paper which has been extracted for 48 hours with methanol, and employing the chloroform-formamide system previously employed. The resulting chromatogram shows only a trace band corresponding to the hydrocortisone starting material with the major band having an ultra-violet adsorption maximum at 242 mu. The paper chromatogram is thoroughly dried, and the band corresponding to the 242 mu adsorption maximum is cut off and extracted with methanol. The methanol extract is evaporated to dryness in vacuo to give $\Delta^{1,4}$-pregnadiene-$11\beta,17\alpha,21$-triol-3,20-dione.

EXAMPLE 9

Six 50 ml.-portions of the edamin medium described in Examples 1 to 8 hereinabove are adjusted to pH 6.5, sterilized by heating for 15 minutes in an autoclave at about 120° C., and each of the sterilized mediums is inoculated with a culture of *Nocardia blackwellii* microorganisms (ATCC 6846). The inoculated cultures are incubated at a temperature of 28° C., with agitation, for a period of about 48 hours, and to each of the six resulting cultures is added a solution of 10 mg. of a different 3-keto-steroid compound in 0.1 ml. of dimethylformamide. The cultures containing the 3-keto-steroid compounds are then incubated, with agitation, for an additional period of about 24 hours.

Each of the fermentation broths thus obtained is individually extracted with four 50 ml.-portions of ethyl acetate, and the ethyl acetate extracts corresponding to each broth and derived from a particular 3-keto-steroid substrate are combined and evaporated to dryness in vacuo. Each of the six residual products thus obtained is dissolved in acetone and streaked on paper chromatograms each of which is developed using the solvent system indicated for the particular substrate starting material in the table hereinbelow. The upper bands for each chromatogram, corresponding to the $\Delta^1$-dehydro derivatives, are cut off, individually extracted with methanol and the methanol-extracted material is again subjected to streak-paper chromatography. The upper band is again cut off, then dried, extracted with methanol, and the methanol extract is evaporated to dryness in vacuo to give, for each substrate used as starting material, the particular $\Delta^{1,4}$-3-keto-steroid compound indicated in the following table:

EXAMPLE 10

Fifty milliliters of a nutrient medium are prepared having the following composition:

| | |
|---|---|
| Cerelose _____ g__ | 1 |
| Edamin _____ g__ | 1 |
| Cornsteep liquor _____ ml__ | 0.25 |

Distilled water to make 50 ml.

This medium is adjusted to pH 6.5 with KOH, sterilized and inoculated with about 2.5 to 5 ml. of a culture of *Nocardia asteroides* (MA 272; ATCC 9970) microorganisms, and the inoculated culture is then incubated at a temperature of 28° C., with agitation, for a 48-hour period. To the resulting culture is added a solution containing 10 mg. of pregnane-$11\beta,17\alpha,21$-triol-3,20-dione dissolved in 0.1 ml. of dimethylformamide. The culture containing the steroid compound is incubated, with agitation, for an additional period of about 12 hours at 28° C.

The fermentation broth is extracted with four 50 ml.-portions of ethyl acetate, and the ethyl acetate extracts are combined and evaporated in vacuo to a volume of about 5 ml. The concentrated solution is then used to prepare streak-paper chromatograms which are developed utilizing formamide as the stationary liquid phase and chloroform as the mobile liquid phase. The principal band thus secured shows the ultra-violet absorption maximum characteristic of hydrocortisone; the paper chromatogram is dried, and this band is cut off and extracted with methanol. The material extracted with methanol is again subjected to streak-paper chromatography, using paper which has been extracted for 48 hours with methanol, and employing the chloroform-formamide system previously employed. The resulting chromatogram is thoroughly dried, and the band showing the ultra-violet absorption maximum characteristic of hydrocortisone is again cut off and extracted with methanol. The methanol extract is evaporated to dryness in vacuo to give hydrocortisone ($\Delta^4$-pregnene-$11\beta,17\alpha,21$-triol-3,20-dione).

The foregoing procedure is repeated using the same edamin medium, the pregnane-$11\beta,17\alpha,21$-triol-3,20-dione as the substrate, and an incubation period of 12 hours, but employing, in place of the *Nocardia asteroides* (MA 272) microorganisms, the following:

*Nocardia minima*—(MA 292; ATCC 8674)
*Nocardia globerula*—(MA 280; ATCC 9356)
*Nocardia leishmanii*—(MA 281; ATCC 6855)
*Nocardia formica*—(MA 143; NRRL 2470)
*Nocardia asteroides*—(MA 289; ATCC 10904)

Extraction of the resulting fermentation broths and paper chromatography of the dried extracts in a formamide-chloroform system gives, in each case, a band on the chromatogram corresponding to hydrocortisone. Elution of this band in the manner previously described gives hydrocortisone, identified by its ultra-violet absorption spectrum as the principal steroid product obtained.

*Solvent system used for streak paper chromatography*

| Expt. No. | Substrate | Stationary Phase | Mobile Phase | $\Delta^{1,4}$-3-Keto-Steriod Obtained |
|---|---|---|---|---|
| 1 | $\Delta^4$-pregnene-$11\beta$, $17\alpha$, 21-triol-3, 20-dione. | Formamide | Chloroform | $\Delta^{1,4}$-Pregnadiene-$11\beta$, $17\alpha$, 21-triol-3, 20-dione. |
| 2 | Pregnane-$11\beta$, $17\alpha$, 21-triol-3, 20-dione. | do | do | Do. |
| 3 | Pregnane-$17\alpha$, 21-diol-3, 11, 20-trione-21-acetate. | do | 1:1 Chloroform Toluene. | $\Delta^{1,4}$-Pregnadiene-$17\alpha$, 21-diol-3, 11, 20-trione. |
| 4 | Allopregnane-$17\alpha$, 21-diol-3, 11, 20-trione-21-acetate. | do | do | Do. |
| 5 | Pregnane-$17\alpha$, 21-diol-3, 20-dione. | do | Benzene | $\Delta^{1,4}$-Pregnadiene-$17\alpha$, 21-diol-3, 20-dione. |
| 6 | Allopregnane-$17\alpha$, 21-diol, 3, 11-dione-21-acetate. | do | do | Do. |

EXAMPLE 11

A nutrient medium is prepared having the following composition:

| | | |
|---|---|---|
| Cerelose | g | 68 |
| Edamin | g | 68 |
| Cornsteep liquor | ml | 17 |

Distilled water to make 3400 ml.

This medium is adjusted to pH 6.5 with KOH, sterilized and inoculated with about 200 ml. of a vegetative growth of a culture of *Nocardia blackwellii* (MA 273; ATCC 6846) microorganisms, and the inoculated culture is then incubated at a temperature of 28° C., with agitation and aeration, for a 48-hour period. To the resulting culture is added a solution containing 0.64 g. of pregnane-3β,17α,21-triol-11,20-dione 21-acetate dissolved in dimethylformamide. The culture containing the steroid compound is incubated, with agitation and aeration, for an additional period of about 24 hours at 28° C.

The fermentation broth is extracted with ethyl acetate and the extract separated and evaporated to dryness. The residual dried product is partitioned between petroleum ether and 70% aqueous methanol, the petroleum ether layer being discarded. The aqueous methanol containing the product is evaporated under reduced pressure to remove the methanol. The resulting water layer is extracted with ethyl acetate several times and the ethyl acetate layer evaporated to dryness to yield partially purified $\Delta^{1,4}$-pregnadiene-17α,21-diol-3,11,20-trione. This material is dissolved in pyridine and reacted in an excess of acetic anhydride to form $\Delta^{1,4}$-pregnadiene-17α,21-diol-3,11,20-trione 21-acetate, which is recovered from the acetylation mixture by adding water and recovering the precipitated material by filtration. The $\Delta^{1,4}$-pregnadiene-17α,21-diol-3,11,20-trione 21-acetate is dissolved in ether and chromatogramed on activated alumina. The alumina column is developed using, as developing solvents, ether and a mixture of ether/chloroform. The desired product is eluted from the column with chloroform, and the chloroform eluate is evaporated to give a high yield of substantially pure, crystalline $\Delta^{1,4}$-pregnadiene-17α,21-diol-3,11,20-trione 21-acetate.

EXAMPLE 12

Two 50 ml.-portions of the edamin medium described in Examples 1 to 8 hereinabove are adjusted to pH 6.5 with KOH, sterilized by heating for 15 minutes in an autoclave at 120° C., and each of the sterilized mediums is inoculated with a culture of *Nocardia blackwellii* (ATCC 6846) microorganisms. The inoculated cultures are incubated at a temperature of 28° C., with agitation, for a period of about 48 hours. At the end of the incubation period, the culture growths are centrifuged, the cells being retained and the supernatant liquid discarded. The retained cells are washed with distilled water and reconstituted to a volume of 25 ml. using water buffered at pH 7.0. To one of the cell suspensions is added a solution of 5 mg. of pregnane-3,17α,21-triol-11,20-dione 21-acetate in 0.1 ml. of dimethylformamide; to the other cell suspension is added a solution of 5 mg. of pregnane-17α,21-diol-3,11,20-trione 21-acetate in 0.1 ml. of dimethylformamide. The cell suspensions containing the pregnane compounds are then incubated, with agitation, for a period of approximately 12–15 hours.

Each of the fermentation broths thus obtained is individually extracted with four 50 ml.-portions of ethyl acetate. The ethyl acetate extracts corresponding to each of the two broths are combined and evaporated to dryness in vacuo to give, in each case, relatively pure $\Delta^{1,4}$-pregnadiene-17α,21-diol-3,11,20-trione; yield in both instances, as shown by polographic analysis of the products, is in excess of 85% of theory.

Various changes and modifications may be made in carrying out the present invention without departing from the spirit and scope thereof. Insofar as these changes and modifications are within the purview of the annexed claim, they are to be considered as part of my invention.

I claim:

The process which comprises contacting a 3-keto-pregnane compound with the dehydrogenating activity of Nocardia microorganisms, thereby forming the corresponding $\Delta^4$-3-keto-pregnene.

References Cited in the file of this patent

UNITED STATES PATENTS

| | | |
|---|---|---|
| 2,602,769 | Murray | July 8, 1952 |
| 2,756,179 | Fried et al. | July 24, 1956 |

OTHER REFERENCES

Vischer et al.: Experientia IX, 10, 1953, pp. 371–372.
J.A.C.S., 75, Nov. 20, 1953, pp. 5764–5765, 5768, 5769.